United States Patent
Tang

(10) Patent No.: US 11,662,295 B2
(45) Date of Patent: May 30, 2023

(54) DEEP LEARNING METHOD IN AIDING PATIENT DIAGNOSIS AND ABERRANT CELL POPULATION IDENTIFICATION IN FLOW CYTOMETRY

(71) Applicant: Becton, Dickinson and Company, Franklin Lakes, NJ (US)

(72) Inventor: Mengxiang Tang, San Jose, CA (US)

(73) Assignee: BECTON, DICKINSON AND COMPANY, Franklin Lakes, NJ (US)

(*) Notice: Subject to any disclaimer, the term of this patent is extended or adjusted under 35 U.S.C. 154(b) by 234 days.

(21) Appl. No.: 17/128,689

(22) Filed: Dec. 21, 2020

(65) Prior Publication Data

US 2021/0208056 A1 Jul. 8, 2021

Related U.S. Application Data

(60) Provisional application No. 62/957,566, filed on Jan. 6, 2020.

(51) Int. Cl.
| | |
|---|---|
| *G01N 15/14* | (2006.01) |
| *G06K 9/62* | (2022.01) |
| *G06K 9/46* | (2006.01) |
| *G06N 3/02* | (2006.01) |
| *G06V 10/50* | (2022.01) |

(Continued)

(52) U.S. Cl.
CPC ..... *G01N 15/1429* (2013.01); *G01N 15/1463* (2013.01); *G06F 18/231* (2023.01); *G06N 3/02* (2013.01); *G06V 10/507* (2022.01); *G06V 10/764* (2022.01); *G06V 10/82* (2022.01); *G06V 20/69* (2022.01); *G01N 2015/1081* (2013.01); *G01N 2015/1402* (2013.01)

(58) Field of Classification Search
CPC ....... G01N 15/1463; G01N 2015/1081; G01N 2015/1402; G06V 10/507; G06K 9/6219; G06N 3/02
See application file for complete search history.

(56) References Cited

U.S. PATENT DOCUMENTS

| | | |
|---|---|---|
| 9,430,829 B2 | 8/2016 | Madabhushi et al. |
| 2018/0247715 A1 | 8/2018 | Kumar et al. |

FOREIGN PATENT DOCUMENTS

| | | |
|---|---|---|
| JP | 2011521228 A | 7/2011 |
| WO | WO2017053592 A1 | 3/2017 |

(Continued)

*Primary Examiner* — David F Dunphy
(74) *Attorney, Agent, or Firm* — Bret. E. Field; Bozicevic, Field & Francis LLP

(57) ABSTRACT

Aspects of the present disclosure include methods for identifying one or more components of a sample in a flow stream using a dynamic algorithm (e.g., a machine learning algorithm). Methods according to certain embodiments include detecting light from a sample having particles in a flow stream, generating a data signal of parameters of the particles from the detected light, generating an image based on the data signal, comparing the image with one or more image classification parameters and classifying one or more components of the image using a dynamic algorithm that updates the image classification parameters based on the classified components in the image. Systems and integrated circuit devices programmed for practicing the subject methods, such as on a flow cytometer, are also provided.

20 Claims, 3 Drawing Sheets

(51) Int. Cl.
  *G06F 18/231* (2023.01)
  *G06V 10/764* (2022.01)
  *G06V 10/82* (2022.01)
  *G06V 20/69* (2022.01)
  *G01N 15/10* (2006.01)

(56) References Cited

FOREIGN PATENT DOCUMENTS

| | | | |
|---|---|---|---|
| WO | WO2017201540 A1 | 11/2017 | |
| WO | WO 2019/173233 | * 9/2019 | ........... G01N 33/574 |

* cited by examiner

DEEP LEARNING METHOD IN AIDING PATIENT DIAGNOSIS AND ABERRANT CELL POPULATION IDENTIFICATION IN FLOW CYTOMETRY

CROSS-REFERENCE TO RELATED APPLICATION

Pursuant to 35 U.S.C. § 119(e), this application claims priority to the filing dates of U.S. Provisional Patent Application Ser. No. 62/957,566 filed Jan. 6, 2020; the disclosure of which applications is incorporated herein by reference.

INTRODUCTION

Flow-type particle sorting systems, such as sorting flow cytometers, are used to sort particles in a fluid sample based on at least one measured characteristic of the particles. In a flow-type particle sorting system, particles, such as molecules, analyte-bound beads, or individual cells, in a fluid suspension are passed in a stream by a detection region in which a sensor detects particles contained in the stream of the type to be sorted. The sensor, upon detecting a particle of the type to be sorted, triggers a sorting mechanism that selectively isolates the particle of interest.

Particle sensing typically is carried out by passing the fluid stream by a detection region in which the particles are exposed to irradiating light, from one or more lasers, and the light scattering and fluorescence properties of the particles are measured. Particles or components thereof can be labeled with fluorescent dyes to facilitate detection, and a multiplicity of different particles or components may be simultaneously detected by using spectrally distinct fluorescent dyes to label the different particles or components. Detection is carried out using one or more photosensors to facilitate the independent measurement of the fluorescence of each distinct fluorescent dye.

SUMMARY

Aspects of the present disclosure include methods for identifying one or more components of a sample in a flow stream using a dynamic algorithm (e.g., a machine learning algorithm). Methods according to certain embodiments include detecting light from a sample having particles in a flow stream, generating a data signal of parameters of the particles from the detected light, generating an image based on the data signal, comparing the image with one or more image classification parameters and classifying one or more components of the image using a dynamic algorithm that updates the image classification parameters based on the classified components in the image. In some embodiments, the dynamic algorithm is a machine learning algorithm, such as a machine learning algorithm that uses an artificial neural network. For example, the artificial neural network may be a convolutional neural network (CNN) or a region-convolutional neural network (R-CNN). In practicing the subject methods, light from particles in a flow stream is detected with a photodetector and a data signal that includes one or more parameters of the particles is generated. In some instances, the generated data signal may include the parameters of one or more particle population clusters. In some embodiments, methods include selecting one or more of the particle population clusters for generating an image. In some instances, the particle population clusters are gated before generating an image. To gate one or more of the particle population clusters, methods may include comparing parameters of the particle population cluster with a classifier or a threshold and generating an image of the particle population clusters that exceed the threshold or are included within the parameters of the classifier. In other instances, methods include generating an image of all of the particle population clusters.

In some embodiments, generating an image from the data signal includes generating a two-dimensional plot of the particle parameters. In certain embodiments, the two-dimensional plot is a histogram. In some instances, each axis of the histogram includes a particle parameter. In other instances, each bin of the histogram is converted to a pixel in the generated image. In some embodiments, methods include generating a color image from a histogram of the particle parameters by normalizing observations corresponding to each bin of the histogram to one or more distinct colors and assigning a color to each pixel based on the normalized observations of each bin in the histogram. In other embodiments, methods include generating a grey-scale image from a histogram of the particle parameters by normalizing observations corresponding to each bin of the histogram to one or more distinct shades of grey and assigning a shade of grey to each pixel based on the normalized observations of each bin in the histogram. In certain embodiments, the image is generated from two or more bins from concatenated histograms.

In embodiments, methods include classifying one or more components in the generated image. In some instances, classifying one or more components includes determining the presence of different types of particles in the image. In certain instances, the particles are cells and methods include classifying the types of cells, subcellular components or a combination thereof in the generated image. In some embodiments, the components classified in the image may be used to generate a clinical diagnosis, such as a when a particle of interest (e.g., a rare cell) is identified. In other embodiments, the components classified in the image may be used for particle sorting.

Aspects of the disclosure also include systems employing a dynamic algorithm (e.g., a machine learning algorithm) for identifying one or more components of a sample in a flow stream. Systems according to certain embodiments include a light source configured to irradiate a sample having particles in a flow stream; a light detection system having a photodetector; and a processor that includes memory operably coupled to the processor having instructions stored thereon, which when executed by the processor, cause the processor to generate a data signal with the parameters of the particles from light detected from the flow stream; generate an image based on the data signal; compare the image with one or more image classification parameters; and classify one or more components of the image using a dynamic algorithm that updates the image classification parameters based on the classified components in the image. In some embodiments, the dynamic algorithm is a machine learning algorithm, such as a machine learning algorithm that uses an artificial neural network. For example, the artificial neural network may be a convolutional neural network (CNN) or a region-convolutional neural network (R-CNN).

In embodiments, the subject systems include memory with instructions to irradiate particles in a sample with light and generate a data signal from light detected with the photodetector. In some embodiments, systems are configured to generate a data signal having parameters of one or more particle population clusters. In some instances, the memory includes instructions for selecting one or more of the particle population clusters for generating an image. In certain instances, systems are configured to gate the particle population clusters before generating the image. In these instances, the memory may include instructions for comparing a particle population cluster with a predetermined threshold or a classifier and for determining that the particle population cluster exceeds the threshold or is included within the parameters of the classifier. In certain instances, the memory includes instructions to generate an image of all particle population clusters detected by the photodetector.

In some embodiments, systems of interest include a memory having instructions stored thereon, which when executed by the processor, further cause the processor to generate a two-dimensional plot of the particle parameters. In certain embodiments, the two-dimensional plot is a histogram. In some instances, each axis of the histogram includes a particle parameter. In some embodiments, the memory includes instructions for converting each bin of the histogram into a pixel in the generated image. In certain instances, the memory includes instructions for generating a color image from a histogram of the particle parameters by normalizing observations corresponding to each bin of the histogram to one or more distinct colors and assigning a color to each pixel based on the normalized observations of each bin in the histogram. In other instances, the memory includes instructions for generating a grey-scale image from a histogram of the particle parameters by normalizing observations corresponding to each bin of the histogram to one or more distinct shades of grey and assigning a shade of grey to each pixel based on the normalized observations of each bin in the histogram.

In embodiments, the memory includes instructions which cause the processor to classify one or more components in the generated image. In some instances, the instructions include determining the presence of different types of particles in the image. In certain embodiments, systems include a memory having instructions stored thereon, which when executed by the processor, further cause the processor to embodiments, to generate a clinical diagnosis based on the classified components in the image. In other embodiments, systems include memory having instructions for sorting a particle of interest based on the classified components in the image. In some embodiments, systems of interest may include one or more sort decision modules configured to generate a sorting decision based on the classified components in the image. In certain embodiments, systems further include a particle sorter (e.g., having a droplet deflector) for sorting the particles from the flow stream based on the sort decision.

Aspects of the disclosure also include integrated circuit devices programmed to identify one or more components of a sample in a flow stream. Integrated circuit devices of interest may include, in certain instances, a field programmable gate array (FPGA), an application specific integrated circuit (ASIC) or a complex programmable logic device (CPLD). In embodiments, integrated circuits are programmed to generate an image based on a data signal having parameters of particles from light detected from a flow stream; compare the image with one or more image classification parameters; and classify one or more components of the image using a dynamic algorithm that updates the image classification parameters based on the classified components in the image. In some embodiments, the dynamic algorithm is a machine learning algorithm, such as a machine learning algorithm that uses an artificial neural network. For example, the artificial neural network may be a convolutional neural network (CNN) or a region-convolutional neural network (R-CNN).

In embodiments, integrated circuit devices are programmed to receive a data signal generated from light detected from irradiated particles in a flow stream. In some embodiments, the data signal includes parameters of one or more particle population clusters. In some instances, the integrated circuit is programmed to select one or more of the particle population clusters to generate an image. In certain instances, integrated circuits of interest are programmed to gate the particle population clusters before generating the image. In these instances, the integrated circuit is programmed to compare a particle population cluster with a predetermined threshold or a classifier and to determine that the particle population cluster exceeds the threshold or is included within the parameters of the classifier. In certain instances, the integrated circuit is programmed to generate an image of all particle population clusters detected by the photodetector.

In some embodiments, the integrated circuit is programmed to generate a two-dimensional plot of the particle parameters. In certain embodiments, the two-dimensional plot is a histogram. In some instances, each axis of the histogram includes a particle parameter. In some embodiments, the integrated circuit is programmed to convert each bin of the histogram into a pixel in the generated image. In certain instances, the integrated circuit is programmed to generate a color image from a histogram of the particle parameters by normalizing observations corresponding to each bin of the histogram to one or more distinct colors and assigning a color to each pixel based on the normalized observations of each bin in the histogram. In other instances, the integrated circuit is programmed to generate a grey-scale image from a histogram of the particle parameters by normalizing observations corresponding to each bin of the histogram to one or more distinct shades of grey and assigning a shade of grey to each pixel based on the normalized observations of each bin in the histogram.

In embodiments, the integrated circuit is programmed to classify one or more components in the generated image. In some instances, the integrated circuit is programmed to determine the presence of different types of particles in the image. In certain embodiments, the integrated circuit is programmed to generate a clinical diagnosis based on the classified components in the image. In other embodiments, the integrated circuit is programmed to sort a particle of interest based on the classified components in the image.

BRIEF DESCRIPTION OF THE FIGURES

The invention may be best understood from the following detailed description when read in conjunction with the accompanying drawings. Included in the drawings are the following figures:

FIG. 2A depicts a two-dimensional dot plot of data from a particle population cluster. FIG. 2B depicts the two-dimensional dot plot converted to a grey-scale image with 128×128 pixels. FIG. 2C depicts the two-dimensional dot plot converted to a color RGB image with a size of 128×128 pixels.

DETAILED DESCRIPTION

Figure 1:
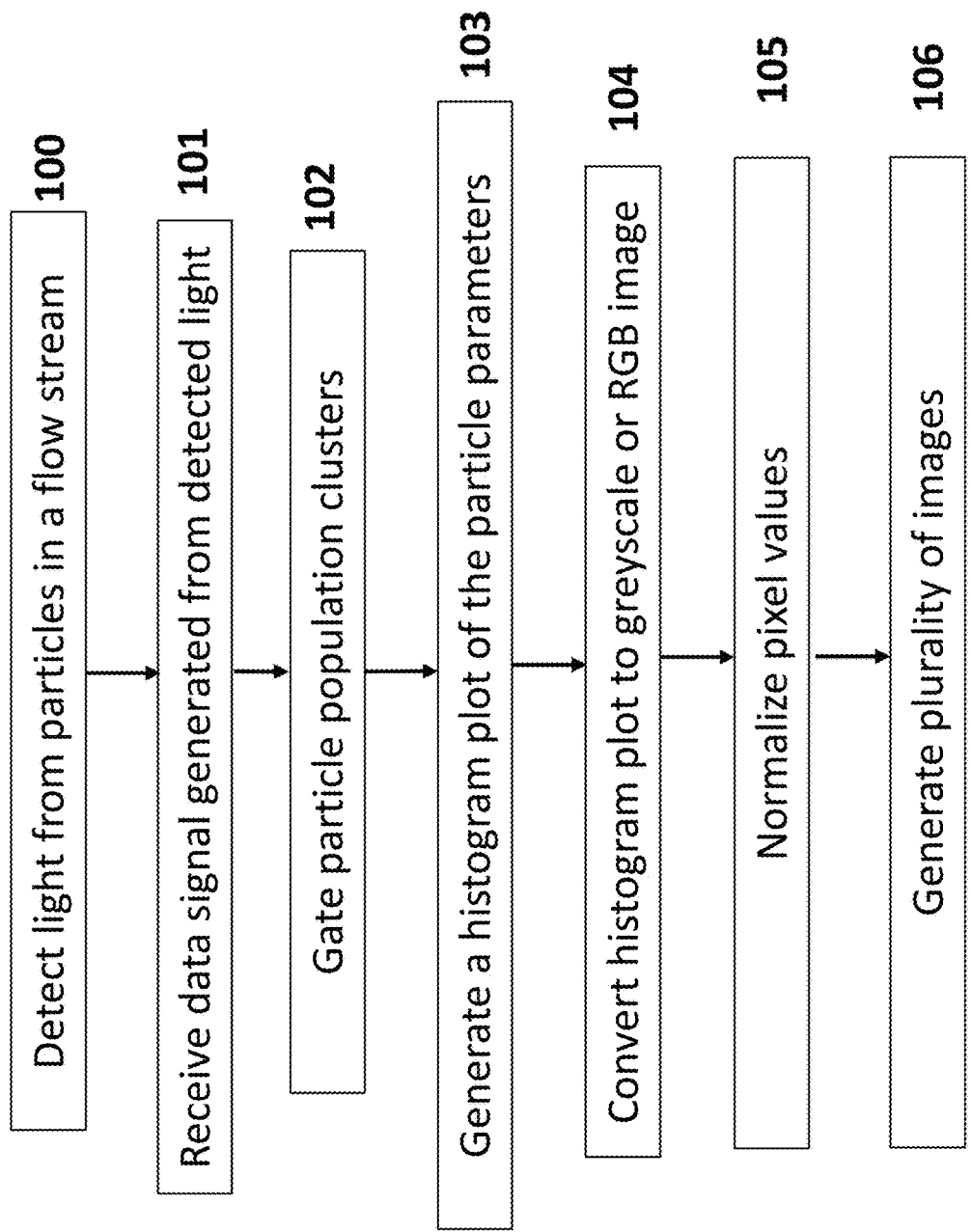
FIG. 1 depicts a flow chart for generating an image for identifying one or more components in a sample in a flow stream using a dynamic algorithm according to certain embodiments.

Aspects of the present disclosure include methods for identifying one or more components of a sample in a flow stream using a dynamic algorithm (e.g., a machine learning algorithm). Methods according to certain embodiments include detecting light from a sample having particles in a flow stream, generating a data signal of parameters of the particles from the detected light, generating an image based on the data signal, comparing the image with one or more image classification parameters and classifying one or more components of the image using a dynamic algorithm that updates the image classification parameters based on the classified components in the image. Systems and integrated circuit devices programmed for practicing the subject methods, such as on a flow cytometer, are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

Methods for Identifying Components of a Sample Using a Dynamic Algorithm

Aspects of the present disclosure include methods for identifying one or more components of a sample in a flow stream using a dynamic algorithm (e.g., a machine learning algorithm). Methods according to certain embodiments include detecting light from a sample having particles in a flow stream, generating a data signal of parameters of the particles from the detected light, generating an image based on the data signal, comparing the image with one or more image classification parameters and classifying one or more components of the image using a dynamic algorithm that updates the image classification parameters based on the classified components in the image.

In practicing the subject methods, a sample having particles in a flow stream is irradiated with light from a light source. In some instances, the sample is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

In some embodiments, the light source used to irradiate the sample is a broadband light source, emitting light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Where methods include irradiating with a broadband light source, broadband light source protocols of interest may include, but are not limited to, a halogen lamp, deuterium arc lamp, xenon arc lamp, stabilized fiber-coupled broadband light source, a broadband LED with continuous spectrum, super-luminescent emitting diode, semiconductor light emitting diode, wide spectrum LED white light source, an multi-LED integrated white light source, among other broadband light sources or any combination thereof.

In other embodiments, methods includes irradiating with a narrow band light source emitting a particular wavelength or a narrow range of wavelengths, such as for example with a light source which emits light in a narrow range of wavelengths like a range of 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Where methods include irradiating with a narrow band light source, narrow band light source protocols of interest may include, but are not limited to, a narrow wavelength LED, laser diode or a broadband light source coupled to one or more optical bandpass filters, diffraction gratings, monochromators or any combination thereof.

In certain embodiments, methods include irradiating the flow stream with one or more lasers. The type and number of lasers will vary depending on the sample as well as desired light collected and may be a pulsed laser or continuous wave laser. For example, the laser may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof; a semiconductor diode laser, optically pumped semiconductor laser (OPSL), or a frequency doubled- or frequency tripled implementation of any of the above mentioned lasers.

The sample in the flow stream may be irradiated with one or more of the above-mentioned light sources, such as 2 or more light sources, such as 3 or more light sources, such as 4 or more light sources, such as 5 or more light sources and including 10 or more light sources. The light source may include any combination of types of light sources. For example, in some embodiments, the methods include irradiating the sample in the flow stream with an array of lasers, such as an array having one or more gas lasers, one or more dye lasers and one or more solid-state lasers.

The sample may be irradiated with wavelengths ranging from 200 nm to 1500 nm, such as from 250 nm to 1250 nm, such as from 300 nm to 1000 nm, such as from 350 nm to 900 nm and including from 400 nm to 800 nm. For example, where the light source is a broadband light source, the sample may be irradiated with wavelengths from 200 nm to 900 nm. In other instances, where the light source includes a plurality of narrow band light sources, the sample may be irradiated with specific wavelengths in the range from 200 nm to 900 nm. For example, the light source may be plurality of narrow band LEDs (1 nm-25 nm) each independently emitting light having a range of wavelengths between 200 nm to 900 nm. In other embodiments, the narrow band light source includes one or more lasers (such as a laser array) and the sample is irradiated with specific wavelengths ranging from 200 nm to 700 nm, such as with a laser array having gas lasers, excimer lasers, dye lasers, metal vapor lasers and solid-state laser as described above.

Where more than one light source is employed, the sample may be irradiated with the light sources simultaneously or sequentially, or a combination thereof. For example, the sample may be simultaneously irradiated with each of the light sources. In other embodiments, the flow stream is sequentially irradiated with each of the light sources. Where more than one light source is employed to irradiate the sample sequentially, the time each light source irradiates the sample may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the sample with the light source (e.g. laser) for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where sample is sequentially irradiated with two or more light sources, the duration sample is irradiated by each light source may be the same or different.

The time period between irradiation by each light source may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each light source is 10 microseconds. In embodiments where sample is sequentially irradiated by more than two (i.e., 3 or more) light sources, the delay between irradiation by each light source may be the same or different.

The sample may be irradiated continuously or in discrete intervals. In some instances, methods include irradiating the sample in the sample with the light source continuously. In other instances, the sample in is irradiated with the light source in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the light source, the sample may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

A light beam generator component may be employed having a laser and an acousto-optic device for frequency shifting the laser light. In these embodiments, methods include irradiating the acousto-optic device with the laser. Depending on the desired wavelengths of light produced in the output laser beam (e.g., for use in irradiating a sample in a flow stream), the laser may have a specific wavelength that varies from 200 nm to 1500 nm, such as from 250 nm to 1250 nm, such as from 300 nm to 1000 nm, such as from 350 nm to 900 nm and including from 400 nm to 800 nm. The acousto-optic device may be irradiated with one or more lasers, such as 2 or more lasers, such as 3 or more lasers, such as 4 or more lasers, such as 5 or more lasers and including 10 or more lasers. The lasers may include any combination of types of lasers. For example, in some embodiments, the methods include irradiating the acousto-optic device with an array of lasers, such as an array having one or more gas lasers, one or more dye lasers and one or more solid-state lasers.

Where more than one laser is employed, the acousto-optic device may be irradiated with the lasers simultaneously or sequentially, or a combination thereof. For example, the acousto-optic device may be simultaneously irradiated with each of the lasers. In other embodiments, the acousto-optic device is sequentially irradiated with each of the lasers. Where more than one laser is employed to irradiate the acousto-optic device sequentially, the time each laser irradiates the acousto-optic device may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the acousto-optic device with the laser for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where the acousto-optic device is sequentially irradiated with two or more lasers, the duration the acousto-optic device is irradiated by each laser may be the same or different.

The time period between irradiation by each laser may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each laser is 10 microseconds. In embodiments where the acousto-optic device is sequentially irradiated by more than two (i.e., 3 or more) lasers, the delay between irradiation by each laser may be the same or different.

The acousto-optic device may be irradiated continuously or in discrete intervals. In some instances, the methods include irradiating the acousto-optic device with the laser continuously. In other instances, the acousto-optic device is irradiated with the laser in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the laser, the acousto-optic device may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

In embodiments, the methods include applying radiofrequency drive signals to the acousto-optic device to generate angularly deflected laser beams. Two or more radiofrequency drive signals may be applied to the acousto-optic device to generate an output laser beam with the desired number of angularly deflected laser beams, such as 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including 100 or more radiofrequency drive signals.

The angularly deflected laser beams produced by the radiofrequency drive signals each have an intensity based on the amplitude of the applied radiofrequency drive signal. In some embodiments, methods include applying radiofrequency drive signals having amplitudes sufficient to produce angularly deflected laser beams with a desired intensity. In some instances, each applied radiofrequency drive signal independently has an amplitude from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to about 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In some embodiments, the sample in the flow stream is irradiated with an output laser beam from an acousto-optic device that includes angularly deflected laser beams each having an intensity based on the amplitude of the applied radiofrequency drive signal. For example, the output laser beam used to irradiate the particle in the flow stream may include 2 or more angularly deflected laser beams, such as 3 or more, such as 4 or more, such as 5 or more, such as 6 or more, such as 7 or more, such as 8 or more, such as 9 or more, such as 10 or more and including 25 or more angularly deflected laser beams. In embodiments, each of the angularly deflected laser beams have different frequencies which are shifted from frequency of the input laser beam by a predetermined radiofrequency.

Each angularly deflected laser beam is also spatially shifted from each other. Depending on the applied radiofrequency drive signals and desired irradiation profile of the output laser beam, the angularly deflected laser beams may be separated by 0.001 µm or more, such as by 0.005 µm or more, such as by 0.01 µm or more, such as by 0.05 µm or more, such as by 0.1 µm or more, such as by 0.5 µm or more, such as by 1 µm or more, such as by 5 µm or more, such as by 10 µm or more, such as by 100 µm or more, such as by 500 µm or more, such as by 1000 µm or more and including by 5000 µm or more. In some embodiments, the angularly deflected laser beams overlap, such as with an adjacent angularly deflected laser beam along a horizontal axis of the output laser beam. The overlap between adjacent angularly deflected laser beams (such as overlap of beam spots) may be an overlap of 0.001 µm or more, such as an overlap of 0.005 µm or more, such as an overlap of 0.01 µm or more, such as an overlap of 0.05 µm or more, such as an overlap of 0.1 µm or more, such as an overlap of 0.5 µm or more, such as an overlap of 1 µm or more, such as an overlap of 5 µm or more, such as an overlap of 10 µm or more and including an overlap of 100 µm or more.

In certain instances, the flow stream is irradiated with a plurality of beams of frequency-shifted light and a cell in the flow stream is imaged by fluorescence imaging using radiofrequency tagged emission (FIRE) to generate a frequency-encoded image, such as those described in Diebold, et al. *Nature Photonics* Vol. 7(10); 806-810 (2013) as well as described in U.S. Pat. Nos. 9,423,353; 9,784,661 and 10,006,852 and U.S. Patent Publication Nos. 2017/0133857 and 2017/0350803, the disclosures of which are herein incorporated by reference.

In practicing the subject methods, light from the irradiated sample is measured, such as by collecting light from the sample over a range of wavelengths (e.g., 200 nm-1000 nm). In embodiments, methods may include one or more of measuring light absorption by the sample (e.g., brightfield light data), measuring light scatter (e.g., forward or side scatter light data) and measuring light emission by the sample (e.g., fluorescence light data). As described in greater detail below, images of particles in the flow stream may be generated from detected light absorption, detected light scatter (forward scattered light, side scattered light, back scattered light), detected light emission or any combination thereof. The collected light may be detected continuously or in discrete intervals. In some instances, methods include detecting the light continuously. In other instances, the light is measured in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Measurements of the detected light may be taken one or more times during the subject methods, such as 2 or more times, such as 3 or more times, such as 5 or more times and including 10 or more times. In certain embodiments, light from the sample is measured 2 or more times, with the data in certain instances being averaged.

In some embodiments, methods include further adjusting the light from the sample before detecting the light. For example, the light from the sample source may be passed through one or more lenses, mirrors, pinholes, slits, gratings, light refractors, and any combination thereof. In some instances, the collected light is passed through one or more focusing lenses, such as to reduce the profile of the light. In other instances, the emitted light from the sample is passed through one or more collimators to reduce light beam divergence.

In embodiments, one or more parameters of the particles in the sample are determined from the detected light. In one example, methods include detecting light with a brightfield photodetector configured to generate a brightfield data signal in response to detected light. In another example, methods include detecting light with a light scatter detector (forward scatter, side scatter) configured to generate a scattered light data signal in response to detected light. In still another example, methods include detecting light with a fluorescence detector configured to generate a fluorescence data signal in response to detected light.

In certain embodiments, methods include detecting fluorescence from the sample with one or more fluorescence detectors. As described in greater detail below, the light detection system may include one or more fluorescence detectors, such as 2 or more, such as 3 or more, such as 4 or more, such as 5 or more, such as 6 or more, such as 7 or more, such as 8 or more, such as 9 or more, such as 10 or more, such as 15 or more and including 25 or more fluorescence detectors. In embodiments, each of the fluorescence detectors is configured to generate a fluorescence data signal. Fluorescence from the sample may be detected by each fluorescence detector, independently, over one or more of the wavelength ranges of 200 nm-1200 nm. In some instances, methods include detecting fluorescence from the sample over a range of wavelengths, such as from 200 nm to 1200 nm, such as from 300 nm to 1100 nm, such as from 400 nm to 1000 nm, such as from 500 nm to 900 nm and including from 600 nm to 800 nm. In other instances, methods include detecting fluorescence with each fluorescence detector at one or more specific wavelengths. For example, the fluorescence may be detected at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof, depending on the number of different fluorescence detectors in the subject light detection system. In certain embodiments, methods include detecting wavelengths of light which correspond to the fluorescence peak wavelength of certain fluorophores present in the sample.

In practicing the subject methods, a data signal having parameters of particles in the sample is generated from the detected light. In some embodiments, parameters of the particles may include the parameters of one or more particle population clusters. In these embodiments, the data signal used to generate an image for identifying and classifying components of the sample may include the parameters of 2 or more particle population clusters, such as 3 or more, such as 4 or more, such as 5 or more and including the parameters of 10 or more particle population clusters. Each particle population cluster may include 5 or more assigned particles, such as 10 or more assigned particles, such as 50 or more assigned particles, such as 100 or more assigned particles, such as 500 assigned particles and including 1000 assigned particles. In certain embodiments, the particle population cluster is a grouping of rare events (e.g., rare cells such as cancer cells) and the particle population cluster includes 50 or fewer particles, such as 25 or fewer particles, such as 10 or fewer particles and including 5 or fewer particles.

In some embodiments, methods include selecting one or more of the particle population clusters for generating an image. In some instances, the particle population clusters are gated before generating the image. In these instances, methods include identifying a gate suitable for classifying particle population clusters based on the parameters of the particles in the cluster. To select an appropriate gate, methods may further include plotting the parameters (e.g., on a scatter plot) so as to obtain the best separation of subpopulations possible. In certain embodiments, methods include plotting forward light scatter (FSC) vs. side (i.e., orthogonal) light scatter (SSC) on a two-dimensional dot plot. In yet other embodiments, methods include plotting one or more of the determined properties (e.g., size, center of mass, eccentricity) against one or more of forward light scatter (FSC) and side (i.e., orthogonal) light scatter (SSC). In still other embodiments, methods include gating the population of particles for forward light scatter (FSC) and side (i.e., orthogonal) light scatter (SSC), followed by gating based on one or more of the determined properties (e.g., size, center of mass, eccentricity) of the particle. A subpopulation of objects is then selected (e.g., single cells within the gate) and particles that are not within the gate are excluded. Only those particles within the classification parameters are then further used to generate an image.

In some instances, gating is based on a threshold between the determined parameters of the particles in the particle population cluster and the parameters of desired particle classifications. In certain instances, one or more parameters of the particle classifications are adjusted by changing a threshold for generating the particle population cluster gating decision. In some embodiments, the threshold is a predetermined threshold. In other embodiments, the threshold is a user configurable threshold. In still other embodiments, the threshold is a dynamic threshold.

Where the threshold is a dynamic threshold, methods may further include updating the threshold with an algorithm (e.g., an algorithm programmed into an integrated circuit as described in greater detail below) for generating the particle population cluster gating decision. In some embodiments, the algorithm for updating the threshold is a static, predetermined algorithm. In other embodiments, the algorithm for updating the threshold is a user configurable algorithm. In still other embodiments, the algorithm for updating the threshold is a dynamic algorithm that updates the particle population cluster gating decision based on the calculated parameters of particles in the population cluster and the parameters of the gate. For example, the dynamic algorithm may be a machine-learning algorithm which updates the particle population cluster gating decision parameters based on determined parameters of the particles in the population cluster.

Generating an image according to certain embodiments of the subject methods includes generating one or more two-dimensional plots of the parameters of particles (e.g., particles in the gated particle population clusters) in the sample. For example, methods may include generating two or more two-dimensional plots, such as three or more, such as four or more, such as five or more and including generating ten or more two-dimensional plots of the particle parameters from the data signal. In certain embodiments, the two-dimensional plot is a histogram. In some instances, each axis of the histogram includes a particle parameter. The image may be generated from the histogram by converting each bin of the histogram into a pixel in the image. In some instances, methods include generating a greyscale image from the histogram. The term "greyscale" is used herein in its conventional sense to refer to images that are composed of varying shades of gray that are based on the intensity of light at each pixel. In some instances, generating a greyscale image from a histogram of particle parameters includes normalizing observations corresponding to each bin of the histogram to one or more distinct shades of grey and assigning a shade of grey to each pixel based on the normalized observations of each bin in the histogram. In certain embodiments, grey-scale images are generated from the bins of two or more concatenated histograms, such as three or more, such as four or more, such as five or more and including the bins of ten or more concatenated histograms.

In other embodiments, methods include generating a color image from the histogram. The color image in certain instances is a RGB color-model image. In some instances, generating a color image from a histogram of particle parameters includes normalizing observations corresponding to each bin of the histogram to one or more distinct colors and assigning a color to each pixel based on the normalized observations of each bin in the histogram. In certain embodiments, color images are generated from the bins of two or more concatenated histograms, such as three or more, such as four or more, such as five or more and including the bins of ten or more concatenated histograms.

In embodiments, one or more images may be generated from the two-dimensional plots (e.g., histograms), such as 2 or more images, such as 3 or more images, such as 4 or more images, such as 5 or more images and including 10 or more images may be generated from the two-dimensional plots of the parameters of the particles in the sample. In some embodiments, one or more of the individual images generated may be used in the dynamic algorithm (e.g., to update the dynamic algorithm) as described herein, such as where 2 or more images are used in the dynamic algorithm, such as 3 or more images, such as 4 or more images, such as 5 or more images and including 10 or more images. In certain instances, all of the individual images generated are used in the dynamic algorithm. In other embodiments, a large image is generated by concatenating two or more images, such as 3 or more images, such as 4 or more images, such as 5 or more images and including 10 or more images. In certain instances, one or more individual images may be used in combination with one or more concatenated images in the dynamic algorithm.

FIG. 1 depicts a flow chart for generating an image for identifying one or more components in a sample in a flow stream using a dynamic algorithm according to certain embodiments. At step 100, light (light absorption, scattered light or emission) from a particle (e.g., cell) in a flow stream are detected. At step 101, a data signal of parameters of one or more particle population clusters generated from the detected light is received (e.g., by an integrated circuit). At step 102, a gate suitable for classifying the particle population clusters based on the parameters of the particles in the cluster is identified. At step 103, a histogram plot of the parameters is generated having a plurality of bins. The histogram plot is converted to a greyscale or color (e.g., RGB) image at step 104 where each bin is converted to a pixel in the image. At step 105, the pixel values of the image are normalized (e.g., from 0 to 255 by mapping the highest value to 0 and 0 to 255). A plurality (e.g., n(n−1)/2) of images are generated at step 106 and a large image can be generated by concatenating the images.

Figure 2B:
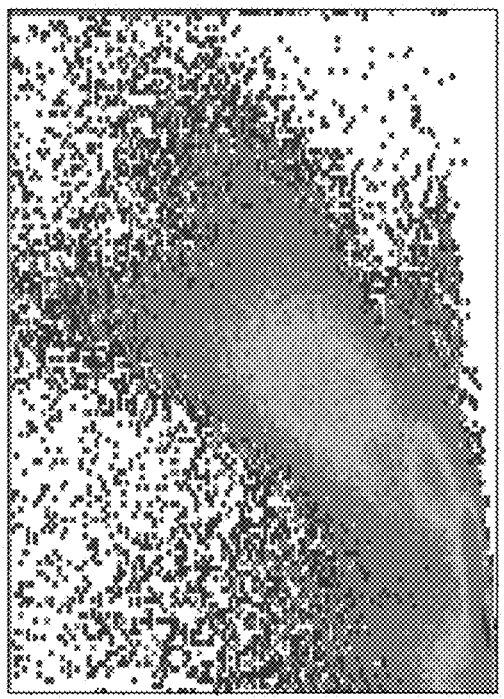
FIG. 2A-2C depict examples of two-dimensional dot plots converted to images according to certain embodiments.
Figure 2C:
Figure 2A:
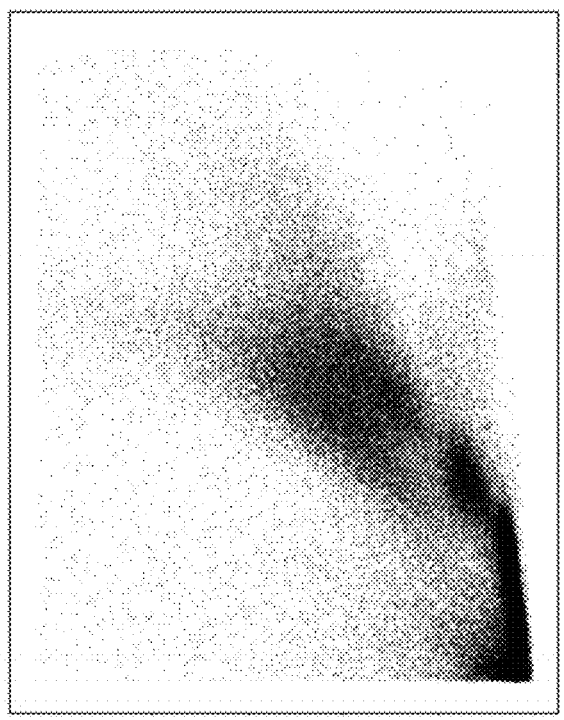

FIGS. 2A-2C depict examples of two-dimensional dot plots converted to images according to certain embodiments. FIG. 2A depicts a two-dimensional dot plot of data from a particle population cluster. FIG. 2B depicts the two-dimensional dot plot converted to a grey-scale image with 128× 128 pixels. FIG. 2C depicts the two-dimensional dot plot converted to a color RGB image with a size of 128×128 pixels.

In embodiments, methods include classifying one or more components in the generated image with a dynamic algorithm that updates image classification parameters based on the classified components in the image. In some instances, the image includes a plurality of particle population clusters and methods include classifying one or more of the particle population clusters in the image, such as two or more particle population clusters, such as three or more, such as four or more, such as five or more and including classifying ten or more particle population clusters in the image using the dynamic algorithm. As described above, each particle cluster may include 5 or more assigned particles, such as 10 or more assigned particles, such as 50 or more assigned particles, such as 100 or more assigned particles, such as 500 assigned particles and including 1000 assigned particles. In certain embodiments, the particle population cluster is a grouping of rare events and methods include classifying images as containing rare cells in the sample, for example cancer cells.

In some embodiments, classifying one or more components in the generated image includes locating the presence of an object (e.g., a particle) in the image with the dynamic algorithm. In other embodiments, classifying one or more components in the generated image includes identifying an object (e.g., a particle or cell type of interest) that is in the image with the dynamic algorithm. Identifying an object in the image may include assessing one or more characteristics of the object. For example, methods may include determining the size, the center of mass or the eccentricity along a horizontal axis or vertical axis of objects in the image.

In some embodiments, the dynamic algorithm is a machine learning algorithm, such as a machine learning algorithm that updates based on previous classification, localizing or identifying of components in previously generated images (e.g., previous images or identified components in previous images serve as a training set for classification of components in subsequently generated images). Any convenient image classification, object localization or object identification machine learning protocol can be used to characterize the generated images described herein. In some embodiments, the dynamic algorithm is a machine learning algorithm that classifies, localizes or identifies components in images in real-time. In certain embodiments, machine learning algorithms of interest are deep learning algorithms that implement an artificial neural network, such as a convolutional neural network (CNN) or a region-convolutional neural network (R-CNN). In other embodiments, machine learning algorithms of interest employ a YOLO object recognition model, such as the YOLOv2, YOLO9000 and YOLOv3.

In some instances, classifying one or more components of the generated image includes determining that a particle of interest is present in the image. In certain instances, particles of interest are cells and methods include classifying the types of cells, subcellular components or a combination thereof in the generated image. Where a particular type of cell is determined to be present in the sample based one or more generated image, methods may further include generating a clinical diagnosis. For example, in embodiments where the dynamic algorithm identifies that one or more of the generated images includes a type of cell or cell marker of interest, methods may include diagnosing a subject as having a health condition or disease associated with the presence of the cell or cell marker.

Figure 3:
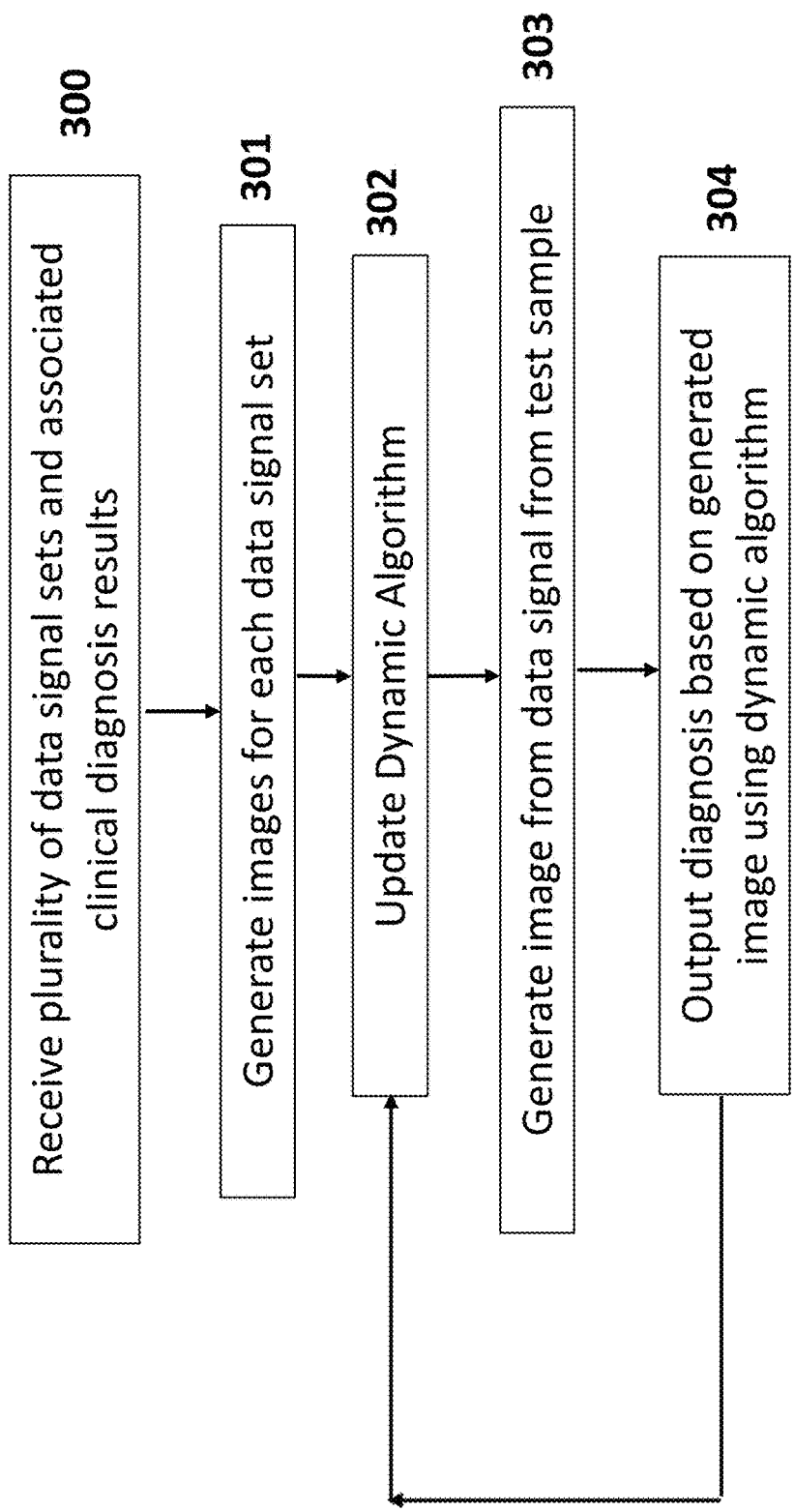
FIG. 3 depicts a flow chart for generating a clinical diagnosis from a sample based on images generated according to certain embodiments

FIG. 3 depicts a flow chart for generating a clinical diagnosis from a sample based on images generated according to certain embodiments. At step 300, a plurality of sets of data signals having parameters of particles and associated clinical diagnosis results for each set of data signals are received (e.g., by an integrated circuit programmed as described herein). A plurality of images is generated at step 301. The dynamic algorithm is updated (e.g., deep learning object detection algorithm is trained) at step 302 using one or more of the generated images and associated clinical diagnosis results. In certain embodiments, two or more of the generated images are concatenated to generate a concatenated image that is used to update the dynamic algorithm. A newly acquired data signal having parameters of particles in a test sample are used to generate an image at step 303. Using the updated dynamic algorithm (e.g., trained machine learning algorithm), a diagnosis is outputted at step 304 based on the image or concatenated image generated at step 303. In certain embodiments, the image or concatenated image generated at step 303 is further used to update the dynamic algorithm.

In certain embodiments, methods include sorting particles of the sample in the flow stream based on the classification of the components in the image. The term "sorting" is used herein in its conventional sense to refer to separating components (e.g., droplets containing cells, droplets containing non-cellular particles such as biological macromolecules) of a sample and in some instances, delivering the separated components to one or more sample collection containers. For example, methods may include sorting 2 or more components of the sample, such as 3 or more components, such as 4 or more components, such as 5 or more components, such as 10 or more components, such as 15 or more components and including sorting 25 or more components of the sample.

In some embodiments, methods for sorting components of sample include sorting particles (e.g., cells in a biological sample) with particle sorting module having deflector plates, such as described in U.S. Patent Publication No. 2017/0299493, filed on Mar. 28, 2017, the disclosure of which is incorporated herein by reference. In certain embodiments, cells of the sample are sorted using a sort decision module having a plurality of sort decision units, such as those described in U.S. Provisional Patent Application No. 62/803,264, filed on Feb. 8, 2019, the disclosure of which is incorporated herein by reference.

Systems for Identifying Components of a Sample Using a Dynamic Algorithm

As summarized above, aspects of the present disclosure also include systems employing a dynamic algorithm (e.g., a machine learning algorithm) for identifying one or more components of a sample in a flow stream. Systems according to certain embodiments include a light source configured to irradiate a sample having particles in a flow stream; a light detection system having a photodetector; and a processor that includes memory operably coupled to the processor having instructions stored thereon, which when executed by the processor, cause the processor to generate a data signal with the parameters of the particles from light detected from the flow stream; generate an image based on the data signal; compare the image with one or more image classification parameters; and classify one or more components of the image using a dynamic algorithm that updates the image classification parameters based on the classified components in the image.

Systems of interest include a light source configured to irradiate a sample in a flow stream. In embodiments, the light source may be any suitable broadband or narrow band source of light. Depending on the components in the sample (e.g., cells, beads, non-cellular particles, etc.), the light source may be configured to emit wavelengths of light that vary, ranging from 200 nm to 1500 nm, such as from 250 nm to 1250 nm, such as from 300 nm to 1000 nm, such as from 350 nm to 900 nm and including from 400 nm to 800 nm. For example, the light source may include a broadband light source emitting light having wavelengths from 200 nm to 900 nm. In other instances, the light source includes a narrow band light source emitting a wavelength ranging from 200 nm to 900 nm. For example, the light source may be a narrow band LED (1 nm-25 nm) emitting light having a wavelength ranging between 200 nm to 900 nm.

In some embodiments, the light source is a laser. Lasers of interest may include pulsed lasers or continuous wave lasers. For example, the laser may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof; a semiconductor diode laser, optically pumped semiconductor laser (OPSL), or a frequency doubled- or frequency tripled implementation of any of the above mentioned lasers.

In other embodiments, the light source is a non-laser light source, such as a lamp, including but not limited to a halogen lamp, deuterium arc lamp, xenon arc lamp, a light-emitting diode, such as a broadband LED with continuous spectrum, superluminescent emitting diode, semiconductor light emitting diode, wide spectrum LED white light source, an multi-LED integrated. In some instances the non-laser light source is a stabilized fiber-coupled broadband light source, white light source, among other light sources or any combination thereof.

In certain embodiments, the light source is a light beam generator that is configured to generate two or more beams of frequency shifted light. In some instances, the light beam generator includes a laser, a radiofrequency generator configured to apply radiofrequency drive signals to an acousto-optic device to generate two or more angularly deflected laser beams. In these embodiments, the laser may be a pulsed lasers or continuous wave laser. For example lasers in light beam generators of interest may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

The acousto-optic device may be any convenient acousto-optic protocol configured to frequency shift laser light using applied acoustic waves. In certain embodiments, the acousto-optic device is an acousto-optic deflector. The acousto-optic device in the subject system is configured to generate angularly deflected laser beams from the light from the laser and the applied radiofrequency drive signals. The radiofrequency drive signals may be applied to the acousto-optic device with any suitable radiofrequency drive signal source, such as a direct digital synthesizer (DDS), arbitrary waveform generator (AWG), or electrical pulse generator.

In embodiments, a controller is configured to apply radiofrequency drive signals to the acousto-optic device to produce the desired number of angularly deflected laser beams in the output laser beam, such as being configured to apply 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including being configured to apply 100 or more radiofrequency drive signals.

In some instances, to produce an intensity profile of the angularly deflected laser beams in the output laser beam, the controller is configured to apply radiofrequency drive signals having an amplitude that varies such as from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In certain embodiments, the controller has a processor having memory operably coupled to the processor such that the memory includes instructions stored thereon, which when executed by the processor, cause the processor to produce an output laser beam with angularly deflected laser beams having a desired intensity profile. For example, the memory may include instructions to produce two or more angularly deflected laser beams with the same intensities, such as 3 or more, such as 4 or more, such as 5 or more, such as 10 or more, such as 25 or more, such as 50 or more and including memory may include instructions to produce 100 or more angularly deflected laser beams with the same intensities. In other embodiments, the may include instructions to produce two or more angularly deflected laser beams with different intensities, such as 3 or more, such as 4 or more, such as 5 or more, such as 10 or more, such as 25 or more, such as 50 or more and including memory may include instructions to produce 100 or more angularly deflected laser beams with different intensities.

In certain embodiments, the controller has a processor having memory operably coupled to the processor such that the memory includes instructions stored thereon, which when executed by the processor, cause the processor to produce an output laser beam having increasing intensity from the edges to the center of the output laser beam along the horizontal axis. In these instances, the intensity of the angularly deflected laser beam at the center of the output beam may range from 0.1% to about 99% of the intensity of the angularly deflected laser beams at the edge of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the edge of the output laser beam along the horizontal axis. In other embodiments, the controller has a processor having memory operably coupled to the processor such that the memory includes instructions stored thereon, which when executed by the processor, cause the processor to produce an output laser beam having an increasing intensity from the edges to the center of the output laser beam along the horizontal axis. In these instances, the intensity of the angularly deflected laser beam at the edges of the output beam may range from 0.1% to about 99% of the intensity of the angularly deflected laser beams at the center of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the center of the output laser beam along the horizontal axis. In yet other embodiments, the controller has a processor having memory operably coupled to the processor such that the memory includes instructions stored thereon, which when executed by the processor, cause the processor to produce an output laser beam having an intensity profile with a Gaussian distribution along the horizontal axis. In still other embodiments, the controller has a processor having memory operably coupled to the processor such that the memory includes instructions stored thereon, which when executed by the processor, cause the processor to produce an output laser beam having a top hat intensity profile along the horizontal axis.

In embodiments, light beam generators of interest may be configured to produce angularly deflected laser beams in the output laser beam that are spatially separated. Depending on the applied radiofrequency drive signals and desired irradiation profile of the output laser beam, the angularly deflected laser beams may be separated by 0.001 μm or more, such as by 0.005 μm or more, such as by 0.01 μm or more, such as by 0.05 μm or more, such as by 0.1 μm or more, such as by 0.5 μm or more, such as by 1 μm or more, such as by 5 μm or more, such as by 10 μm or more, such as by 100 μm or more, such as by 500 μm or more, such as by 1000 μm or more and including by 5000 μm or more. In some embodiments, systems are configured to produce angularly deflected laser beams in the output laser beam that overlap, such as with an adjacent angularly deflected laser beam along a horizontal axis of the output laser beam. The overlap between adjacent angularly deflected laser beams (such as overlap of beam spots) may be an overlap of 0.001 μm or more, such as an overlap of 0.005 μm or more, such as an overlap of 0.01 μm or more, such as an overlap of 0.05 μm or more, such as an overlap of 0.1 μm or more, such as an overlap of 0.5 μm or more, such as an overlap of 1 μm or more, such as an overlap of 5 μm or more, such as an overlap of 10 μm or more and including an overlap of 100 μm or more.

In certain instances, light beam generators configured to generate two or more beams of frequency shifted light include laser excitation modules as described in U.S. Pat. Nos. 9,423,353; 9,784,661 and 10,006,852 and U.S. Patent Publication Nos. 2017/0133857 and 2017/0350803, the disclosures of which are herein incorporated by reference.

In embodiments, systems include a light detection system having one or more of a brightfield photodetector, a light scatter (forward light scatter, side light scatter) detector and a fluorescence detector for detecting and measuring light from the sample. The subject brightfield, light scatter and fluorescence detectors of interest may include, but are not limited to optical sensors, such as active-pixel sensors (APSs), avalanche photodiode, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, light from a sample is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the brightfield photodetector includes an avalanche photodiode (APD). In some instances, the light scatter detector is an avalanche photodiode. In certain instances, one or more of the fluorescence detectors are avalanche photodiodes.

In some embodiments, light detection systems of interest include a plurality of fluorescence detectors. In some instances, the light detection system includes a plurality of solid-state detectors such as photodiodes. In certain instances, the light detection system includes a fluorescence photodetector array, such as an array of photodiodes. In these embodiments, the photodetector array may include 4 or more photodetectors, such as 10 or more photodetectors, such as 25 or more photodetectors, such as 50 or more photodetectors, such as 100 or more photodetectors, such as 250 or more photodetectors, such as 500 or more photodetectors, such as 750 or more photodetectors and including 1000 or more photodetectors. For example, the detector may be a photodiode array having 4 or more photodiodes, such as 10 or more photodiodes, such as 25 or more photodiodes, such as 50 or more photodiodes, such as 100 or more photodiodes, such as 250 or more photodiodes, such as 500 or more photodiodes, such as 750 or more photodiodes and including 1000 or more photodiodes.

The photodetectors may be arranged in any geometric configuration as desired, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular patterned configurations. The photodetectors in the photodetector array may be oriented with respect to the other (as referenced in an X-Z plane) at an angle ranging from 10° to 180°, such as from 15° to 170°, such as from 20° to 160°, such as from 25° to 150°, such as from 30° to 120° and including from 45° to 90°. The photodetector array may be any suitable shape and may be a rectilinear shape, e.g., squares, rectangles, trapezoids, triangles, hexagons, etc., curvilinear shapes, e.g., circles, ovals, as well as irregular shapes, e.g., a parabolic bottom portion coupled to a planar top portion. In certain embodiments, the photodetector array has a rectangular-shaped active surface.

Each photodetector (e.g., photodiode) in the array may have an active surface with a width that ranges from 5 µm to 250 µm, such as from 10 µm to 225 µm, such as from 15 µm to 200 µm, such as from 20 µm to 175 µm, such as from 25 µm to 150 µm, such as from 30 µm to 125 µm and including from 50 µm to 100 µm and a length that ranges from 5 µm to 250 µm, such as from 10 µm to 225 µm, such as from 15 µm to 200 µm, such as from 20 µm to 175 µm, such as from 25 µm to 150 µm, such as from 30 µm to 125 µm and including from 50 µm to 100 µm, where the surface area of each photodetector (e.g., photodiode) in the array ranges from 25 to µm$^2$ to 10000 µm$^2$, such as from 50 to µm$^2$ to 9000 µm$^2$, such as from 75 to µm$^2$ to 8000 µm$^2$, such as from 100 to µm$^2$ to 7000 µm$^2$, such as from 150 to µm$^2$ to 6000 µm$^2$ and including from 200 to µm$^2$ to 5000 µm$^2$.

The size of the photodetector array may vary depending on the amount and intensity of the light, the number of photodetectors and the desired sensitivity and may have a length that ranges from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. The width of the photodetector array may also vary, ranging from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. As such, the active surface of the photodetector array may range from 0.1 mm$^2$ to 10000 mm$^2$, such as from 0.5 mm$^2$ to 5000 mm$^2$, such as from 1 mm$^2$ to 1000 mm$^2$, such as from 5 mm$^2$ to 500 mm$^2$, and including from 10 mm$^2$ to 100 mm$^2$.

Photodetectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths.

In some embodiments, light detection systems include a brightfield photodetector configured to generate a brightfield data signal. The brightfield photodetector may be configured to detect light from the sample at one or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including detecting light at 400 or more different wavelengths. The brightfield photodetector may be configured to detect light over one or more of the wavelength ranges of 200 nm-1200 nm. In some instances, methods include detecting light from the sample with the brightfield photodetector over a range of wavelengths, such as from 200 nm to 1200 nm, such as from 300 nm to 1100 nm, such as from 400 nm to 1000 nm, such as from 500 nm to 900 nm and including from 600 nm to 800 nm.

The brightfield photodetector in light detection systems of interest is, in certain embodiments, configured to generate one or more brightfield data signals in response to the detected light, such as 2 or more, such as 3 or more, such as 4 or more, such as 5 or more and including 10 or more brightfield data signals in response to the detected light. Where the brightfield photodetector is configured to detect light over a plurality of wavelengths of light (e.g., from 400 nm to 800 nm), methods in some instances may include generating one or more brightfield data signals in response to each wavelength of light detected. In other instances, a single brightfield data signal is generated in response to light detected by the brightfield photodetector across the entire range of wavelengths.

In some embodiments, light detection systems include a light scatter photodetector configured to generate a light scatter data signal. The light scatter photodetector may be configured to detect light from the sample at one or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including detecting light at 400 or more different wavelengths. The light scatter photodetector may be configured to detect light over one or more of the wavelength ranges of 200 nm-1200 nm. In some instances, methods include detecting light from the sample with the light scatter photodetector over a range of wavelengths, such as from 200 nm to 1200 nm, such as from 300 nm to 1100 nm, such as from 400 nm to 1000 nm, such as from 500 nm to 900 nm and including from 600 nm to 800 nm.

The light scatter photodetector in light detection systems of interest is, in certain embodiments, configured to generate one or more light scatter data signals in response to the detected light, such as 2 or more, such as 3 or more, such as 4 or more, such as 5 or more and including 10 or more light scatter data signals in response to the detected light. Where the light scatter photodetector is configured to detect light over a plurality of wavelengths of light (e.g., from 400 nm to 800 nm), methods in some instances may include generating one or more light scatter data signals in response to each wavelength of light detected. In other instances, a single light scatter data signal is generated in response to light detected by the light scatter photodetector across the entire range of wavelengths.

Light detection systems include one or more brightfield, light scatter or fluorescence detectors, such as 2 or more, such as 3 or more, such as 4 or more, such as 5 or more, such as 6 or more, such as 7 or more, such as 8 or more, such as 9 or more, such as 10 or more, such as 15 or more and including 25 or more detectors. In embodiments, each of the detectors is configured to generate a data signal. Light from the sample may be detected by each detector, independently, over one or more of the wavelength ranges of 200 nm-1200 nm. In some instances, one or more detectors are configured to detect light from the sample over a range of wavelengths, such as from 200 nm to 1200 nm, such as from 300 nm to 1100 nm, such as from 400 nm to 1000 nm, such as from 500 nm to 900 nm and including from 600 nm to 800 nm. In other instances, one or more detectors are configured to detect light at one or more specific wavelengths. For example, the fluorescence may be detected at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof, depending on the number of different detectors in the subject light detection system. In certain embodiments, one or more detectors are configured to detect wavelengths of light which correspond to the fluorescence peak wavelength of certain fluorophores in the sample.

The light detection system is configured to measure light continuously or in discrete intervals. In some instances, the detectors of the light detection system are configured to take measurements of the collected light continuously. In other instances, the light detection system is configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

In embodiments, systems include memory operably coupled to the processor having instructions stored thereon, which when executed by the processor, cause the processor to generate a data signal having the parameters of the particles in the sample. In some embodiments, parameters of the particles may include the parameters of one or more particle population clusters. In these embodiments, the memory includes instructions to generate an image for identifying and classifying components of the sample using a data signal that includes the parameters of 2 or more particle population clusters, such as 3 or more, such as 4 or more, such as 5 or more and including the parameters of 10 or more particle population clusters. Each particle population cluster may include 5 or more assigned particles, such as 10 or more assigned particles, such as 50 or more assigned particles, such as 100 or more assigned particles, such as 500 assigned particles and including 1000 assigned particles. In certain embodiments, the particle population cluster is a grouping of rare events (e.g., rare cells such as cancer cells) and the particle population cluster includes 50 or fewer particles, such as 25 or fewer particles, such as 10 or fewer particles and including 5 or fewer particles.

In some embodiments, systems include memory operably coupled to the processor having instructions stored thereon, which when executed by the processor, cause the processor to select one or more of the particle population clusters for generating an image. In some instances, the memory includes instructions to gate the particle clusters before generating the image. In these instances, the memory includes instructions to identify a gate suitable for classifying particle population clusters based on the parameters of the particles in the cluster. To select an appropriate gate, the memory may include instructions for plotting the parameters (e.g., on a scatter plot) so as to obtain the best separation of subpopulations possible. In certain embodiments, the memory includes instructions for plotting forward light scatter (FSC) vs. side (i.e., orthogonal) light scatter (SSC) on a two-dimensional dot plot. In yet other embodiments, the memory includes instructions for plotting one or more of the determined properties (e.g., size, center of mass, eccentricity) against one or more of forward light scatter (FSC) and side (i.e., orthogonal) light scatter (SSC). In still other embodiments, the memory includes instructions for gating the population of particles for forward light scatter (FSC) and side (i.e., orthogonal) light scatter (SSC), followed by gating based on one or more of the determined properties (e.g., size, center of mass, eccentricity) of the particle. A subpopulation of objects is then selected (e.g., single cells within the gate) and particles that are not within the gate are excluded. In certain embodiments, the memory of systems of interest include instructions to only use those particles within the classification parameters to generate an image.

In some instances, gating is based on a threshold between the determined parameters of the particles in the particle population cluster and the parameters of desired particle classifications. In certain instances, systems are configured to adjust one or more parameters of the particle classifications by changing a threshold for generating the particle population cluster gating decision. In some embodiments, the threshold is a predetermined threshold. In other embodiments, the threshold is a user configurable threshold. In still other embodiments, the threshold is a dynamic threshold. Where the threshold is a dynamic threshold, the memory may include instructions for updating the threshold with an algorithm (e.g., an algorithm programmed into an integrated circuit as described in greater detail below) for generating the particle population cluster gating decision. In some embodiments, the algorithm for updating the threshold is a static, predetermined algorithm. In other embodiments, the algorithm for updating the threshold is a user configurable algorithm. In still other embodiments, the algorithm for updating the threshold is a dynamic algorithm that updates the particle population cluster gating decision based on the calculated parameters of particles in the population cluster and the parameters of the gate. For example, the subject systems may be configured to implement a dynamic algorithm that is a machine-learning algorithm which updates the particle population cluster gating decision parameters based on determined parameters of the particles in the population cluster.

In certain embodiments, systems include memory operably coupled to the processor having instructions stored thereon, which when executed by the processor, cause the processor to generate one or more two-dimensional plots of the parameters of particles (e.g., particles in the gated particle population clusters) in the sample. For example, the memory may include instructions for generating two or more two-dimensional plots, such as three or more, such as four or more, such as five or more and including generating ten or more two-dimensional plots of the particle parameters from the data signal. In certain embodiments, the two-dimensional plot is a histogram. In some instances, each axis of the histogram includes a particle parameter. Systems may be configured to generate an image from the histogram by converting each bin of the histogram into a pixel in the image. In some instances, the memory includes instructions for generating a greyscale image from the histogram. In some instances, systems include memory having instructions to generate a greyscale image from a histogram of particle parameters includes normalizing observations corresponding to each bin of the histogram to one or more distinct shades of grey and assigning a shade of grey to each pixel based on the normalized observations of each bin in the histogram. In certain embodiments, the memory includes instructions for generating grey-scale images from the bins of two or more concatenated histograms, such as three or more, such as four or more, such as five or more and including the bins of ten or more concatenated histograms.

In other embodiments, systems include memory operably coupled to the processor having instructions stored thereon, which when executed by the processor, cause the processor to generate a color image from the histogram.

The color image in certain instances is a RGB color-model image. In some instances, systems include memory having instructions to generate a color image from a histogram of particle parameters by normalizing observations corresponding to each bin of the histogram to one or more distinct colors and assigning a color to each pixel based on the normalized observations of each bin in the histogram. In certain embodiments, systems include memory having instructions to generate color images from the bins of two or more concatenated histograms, such as three or more, such as four or more, such as five or more and including the bins of ten or more concatenated histograms.

Systems may be configured according to some embodiments to generate one or more images from the two-dimensional plots (e.g., histograms), such as 2 or more images, such as 3 or more images, such as 4 or more images, such as 5 or more images and including 10 or more images may be generated from the two-dimensional plots of the parameters of the particles in the sample. In some embodiments, one or more of the individual images generated may be used in the dynamic algorithm (e.g., to update the dynamic algorithm) as described herein, such as where 2 or more images are used in the dynamic algorithm, such as 3 or more images, such as 4 or more images, such as 5 or more images and including 10 or more images. In certain instances, all of the individual images generated are used in the dynamic algorithm. In certain embodiments, systems are configured to generate a large image by concatenating two or more images, such as 3 or more images, such as 4 or more images, such as 5 or more images and including 10 or more images.

In embodiments, systems include memory operably coupled to the processor having instructions stored thereon, which when executed by the processor, cause the processor to classify one or more components in the generated image with a dynamic algorithm that updates image classification parameters based on the classified components in the image. In some instances, the image includes a plurality of particle population clusters and the memory includes instructions for classifying one or more of the particle population clusters in the image, such as two or more particle population clusters, such as three or more, such as four or more, such as five or more and including for classifying ten or more particle population clusters in the image using the dynamic algorithm. In certain embodiments, the particle population cluster is a grouping of rare events and systems include memory having instructions for classifying images as containing rare cells in the sample, for example cancer cells.

In some embodiments, systems include memory having instructions for classifying one or more components in the generated image by locating the presence of an object (e.g., a particle) in the image with the dynamic algorithm. In other embodiments, the memory includes instructions for classifying one or more components in the generated image by identifying an object (e.g., a particle or cell type of interest) that is in the image with the dynamic algorithm. Identifying an object in the image may include assessing one or more characteristics of the object. For example, the memory may include instructions for determining the size, the center of mass or the eccentricity along a horizontal axis or vertical axis of objects in the image.

In some embodiments, systems of interest are configured to implement a dynamic algorithm that is a machine learning algorithm, such as a machine learning algorithm that updates based on previous classification, localizing or identifying of components in previously generated images. Any convenient image classification, object localization or object identification machine learning protocol can be used to characterize the generated images. In some embodiments, systems are configured to implement a the dynamic algorithm that is a machine learning algorithm that classifies, localizes or identifies components in images in real-time. In certain embodiments, machine learning algorithms of interest are deep learning algorithms that implement an artificial neural network, such as a convolutional neural network (CNN) or a region-convolutional neural network (R-CNN). In other embodiments, machine learning algorithms of interest employ a YOLO object recognition model, such as the YOLOv2, YOLO9000 and YOLOv3.

In some instances, systems include memory with instructions for determining that a particle of interest is present in the image. In certain instances, particles of interest are cells and the memory includes instructions for classifying the types of cells, subcellular components or a combination thereof in the generated image. Where it is determined that a particular type of cell is present in the sample based one or more generated image, the memory may further include instructions for generating a clinical diagnosis. For example, in embodiments where the dynamic algorithm identifies that one or more of the generated images includes a type of cell or cell marker of interest, systems may be configured with memory having instructions for diagnosing a subject as having a health condition or disease associated with the presence of the cell or cell marker.

In certain embodiments, systems may be configured with memory having instructions for sorting particles of the sample in the flow stream based on the classification of the components in the image. In some embodiments, the subject systems include a particle sorting module for sorting particles (e.g., cells) of the sample. In certain instances, the particle sorting module is a system such as those described in U.S. Patent Publication No. 2017/0299493, filed on Mar. 28, 2017 and U.S. Provisional Patent Application No. 62/752,793 filed on Oct. 30, 2018, the disclosures of which is incorporated herein by reference. In certain embodiments, the particle sorting component include one or more droplet deflectors such as those described in U.S. Patent Publication No. 2018/0095022, filed on Jun. 14, 2017, the disclosure of which is incorporated herein by reference.

Systems according to some embodiments, may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low-level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, the processor includes analog electronics which provide feedback control, such as for example negative feedback control.

The system memory may be any of a variety of known or future memory storage devices. Examples include any commonly available random-access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described having a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra-Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows 10, Windows NT®, Windows XP, Windows 7, Windows 8, iOS, Sun Solaris, Linux, OS/400, Compaq Tru64 Unix, SGI IRIX, Siemens Reliant Unix, Ubuntu, Zorin OS and others.

In some embodiments, the subject systems are flow cytometric systems. Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem*. January; 49(pt 1):17-28; Linden, et. al., *Semin Throm Hemost*. 2004 October; 30(5):502-11; Alison, et al. *J Pathol,* 2010 December; 222(4):335-344; and Herbig, et al. (2007) *Crit Rev Ther Drug Carrier Syst*. 24(3):203-255; the disclosures of which are incorporated herein by reference. In certain instances, flow cytometry systems of interest include BD Biosciences FACSCanto™ II flow cytometer, BD Accuri™ flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer BD Biosciences LSRFortessa™ flow cytometer, BD Biosciences LSRFortess™ X-20 flow cytometer and BD Biosciences FACSCalibur™ cell sorter, a BD Biosciences FACSCount™ cell sorter, BD Biosciences FACSLyric™ cell sorter and BD Biosciences Via™ cell sorter BD Biosciences Influx™ cell sorter, BD Biosciences Jazz™ cell sorter, BD Biosciences Aria™ cell sorters and BD Biosciences FACSMelody™ cell sorter, or the like.

In some embodiments, the subject particle sorting systems are flow cytometric systems, such those described in U.S. Pat. Nos. 10,006,852; 9,952,076; 9,933,341; 9,784,661; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; the disclosure of which are herein incorporated by reference in their entirety.

In certain instances, the subject systems are flow cytometry systems configured for characterizing and imaging particles in a flow stream by fluorescence imaging using radiofrequency tagged emission (FIRE), such as those described in Diebold, et al. *Nature Photonics* Vol. 7(10); 806-810 (2013) as well as described in U.S. Pat. Nos. 9,423,353; 9,784,661 and 10,006,852 and U.S. Patent Publication Nos. 2017/0133857 and 2017/0350803, the disclosures of which are herein incorporated by reference.

Integrated Circuit Devices

Aspects of the present disclosure also include integrated circuit devices programmed to identify one or more components of a sample in a flow stream. In some embodiments, integrated circuit devices of interest include a field programmable gate array (FPGA). In other embodiments, integrated circuit devices include an application specific integrated circuit (ASIC). In yet other embodiments, integrated circuit devices include a complex programmable logic device (CPLD). Integrated circuits are programmed to generate an image based on a data signal having parameters of particles from light detected from a flow stream; compare the image with one or more image classification parameters; and classify one or more components of the image using a dynamic algorithm that updates the image classification parameters based on the classified components in the image.

In embodiments, integrated circuits are programmed to generate a data signal having the parameters of the particles in the sample. In some embodiments, parameters of the particles may include the parameters of one or more particle population clusters. In these embodiments, the integrated circuit is programmed to generate an image for identifying and classifying components of the sample using a data signal that includes the parameters of 2 or more particle population clusters, such as 3 or more, such as 4 or more, such as 5 or more and including the parameters of 10 or more particle population clusters. Each particle population cluster may include 5 or more assigned particles, such as 10 or more assigned particles, such as 50 or more assigned particles, such as 100 or more assigned particles, such as 500 assigned particles and including 1000 assigned particles. In certain embodiments, the particle population cluster is a grouping of rare events (e.g., rare cells such as cancer cells) and the particle population cluster includes 50 or fewer particles, such as 25 or fewer particles, such as 10 or fewer particles and including 5 or fewer particles.

In some embodiments, the integrated circuit is programmed to select one or more of the particle population clusters for generating an image. In some instances, the integrated circuit is programmed to gate the particle clusters before generating the image. In these instances, the integrated circuit is programmed to identify a gate suitable for classifying particle population clusters based on the parameters of the particles in the cluster. To select an appropriate gate, the memory may include instructions for plotting the parameters (e.g., on a scatter plot) so as to obtain the best separation of subpopulations possible. In certain embodiments, the integrated circuit is programmed to plot forward light scatter (FSC) vs. side (i.e., orthogonal) light scatter (SSC) on a two-dimensional dot plot. In yet other embodiments, the integrated circuit is programmed to plot one or more of the determined properties (e.g., size, center of mass, eccentricity) against one or more of forward light scatter (FSC) and side (i.e., orthogonal) light scatter (SSC). In still other embodiments, the integrated circuit is programmed to gate the population of particles for forward light scatter (FSC) and side (i.e., orthogonal) light scatter (SSC), followed by gating based on one or more of the determined properties (e.g., size, center of mass, eccentricity) of the particle. A subpopulation of objects is then selected (e.g., single cells within the gate) and particles that are not within the gate are excluded. In certain embodiments, the integrated circuit is programmed to only use those particles within the classification parameters to generate an image.

In some instances, gating is based on a threshold between the determined parameters of the particles in the particle population cluster and the parameters of desired particle classifications. In certain instances, the integrated circuit is programmed to adjust one or more parameters of the particle classifications by changing a threshold for generating the particle population cluster gating decision. In some embodiments, the threshold is a predetermined threshold. In other embodiments, the threshold is a user configurable threshold. In still other embodiments, the threshold is a dynamic threshold. Where the threshold is a dynamic threshold, the integrated circuit is programmed to update the threshold with an algorithm for generating the particle population cluster gating decision. In some embodiments, the algorithm for updating the threshold is a static, predetermined algorithm. In other embodiments, the algorithm for updating the threshold is a user configurable algorithm. In still other embodiments, the algorithm for updating the threshold is a dynamic algorithm that updates the particle population cluster gating decision based on the calculated parameters of particles in the population cluster and the parameters of the gate. For example, the integrated circuit may be programmed to implement a dynamic algorithm that is a machine-learning algorithm which updates the particle population cluster gating decision parameters based on determined parameters of the particles in the population cluster.

In certain embodiments, the integrated circuit is programmed to generate one or more two-dimensional plots of the parameters of particles (e.g., particles in the gated particle population clusters) in the sample. For example, the integrated circuit is programmed to generate two or more two-dimensional plots, such as three or more, such as four or more, such as five or more and including generating ten or more two-dimensional plots of the particle parameters from the data signal. In certain embodiments, the two-dimensional plot is a histogram. In some instances, each axis of the histogram includes a particle parameter, the Integrated circuits of interest may be programmed to generate an image from the histogram by converting each bin of the histogram into a pixel in the image. In some instances, the integrated circuit is programmed to generate a greyscale image from the histogram. In some instances, the integrated circuit is programmed to generate a greyscale image from a histogram of particle parameters includes normalizing observations corresponding to each bin of the histogram to one or more distinct shades of grey and assigning a shade of grey to each pixel based on the normalized observations of each bin in the histogram. In certain embodiments, the integrated circuit is programmed to generate grey-scale images from the bins of two or more concatenated histograms, such as three or more, such as four or more, such as five or more and including the bins of ten or more concatenated histograms.

In other embodiments, the integrated circuit is programmed to generate a color image from the histogram. The color image in certain instances is a RGB color-model image. In some instances, the integrated circuit is programmed to generate a color image from a histogram of particle parameters by normalizing observations corresponding to each bin of the histogram to one or more distinct colors and assigning a color to each pixel based on the normalized observations of each bin in the histogram. In certain embodiments, the integrated circuit is programmed to generate color images from the bins of two or more concatenated histograms, such as three or more, such as four or more, such as five or more and including the bins of ten or more concatenated histograms.

The integrated circuit may be programmed according to some embodiments to generate one or more images from the two-dimensional plots (e.g., histograms), such as 2 or more images, such as 3 or more images, such as 4 or more images, such as 5 or more images and including 10 or more images may be generated from the two-dimensional plots of the parameters of the particles in the sample. In some embodiments, one or more of the individual images generated may be used in the dynamic algorithm (e.g., to update the dynamic algorithm) as described herein, such as where 2 or more images are used in the dynamic algorithm, such as 3 or more images, such as 4 or more images, such as 5 or more images and including 10 or more images. In certain instances, all of the individual images generated are used in the dynamic algorithm. In certain embodiments, the integrated circuit is programmed to generate a large image by concatenating two or more images, such as 3 or more images, such as 4 or more images, such as 5 or more images and including 10 or more images.

In embodiments, the integrated circuit is programmed to classify one or more components in the generated image with a dynamic algorithm that updates image classification parameters based on the classified components in the image. In some instances, the image includes a plurality of particle population clusters and the integrated circuit is programmed to classify one or more of the particle population clusters in the image, such as two or more particle population clusters, such as three or more, such as four or more, such as five or more and including ten or more particle population clusters in the image using the dynamic algorithm. In certain embodiments, the particle population cluster is a grouping of rare events and the integrated circuit is programmed to classify images as containing rare cells in the sample, for example cancer cells.

In some embodiments, the integrated circuit is programmed to classify one or more components in the generated image by locating the presence of an object (e.g., a particle) in the image with the dynamic algorithm. In other embodiments, the integrated circuit is programmed to classify one or more components in the generated image by identifying an object (e.g., a particle or cell type of interest) that is in the image with the dynamic algorithm. Identifying an object in the image may include assessing one or more characteristics of the object. For example, the integrated circuit is programmed to determine the size, the center of mass or the eccentricity along a horizontal axis or vertical axis of objects in the image.

In some embodiments, the integrated circuit is programmed to implement a dynamic algorithm that is a machine learning algorithm, such as a machine learning algorithm that updates based on previous classification, localizing or identifying of components in previously generated images. Any convenient image classification, object localization or object identification machine learning protocol can be used to characterize the generated images. In some embodiments, the integrated circuit is programmed to implement a the dynamic algorithm that is a machine learning algorithm that classifies, localizes or identifies components in images in real-time. In certain embodiments, machine learning algorithms of interest are deep learning algorithms that implement an artificial neural network, such as a convolutional neural network (CNN) or a region-convolutional neural network (R-CNN). In other embodiments, machine learning algorithms of interest employ a YOLO object recognition model, such as the YOLOv2, YOLO9000 and YOLOv3.

In some instances, the integrated circuit is programmed to determine that a particle of interest is present in the image. In certain instances, particles of interest are cells and the integrated circuit is programmed to classify the types of cells, subcellular components or a combination thereof in the generated image. Where it is determined that a particular type of cell is present in the sample based one or more generated image, the integrated circuit may further include programming for generating a clinical diagnosis. For example, in embodiments where the dynamic algorithm identifies that one or more of the generated images includes a type of cell or cell marker of interest, the integrated circuit may be programmed to diagnose a subject as having a health condition or disease associated with the presence of the cell or cell marker.

In certain embodiments, the integrated circuit may be operably coupled to a particle sorter and is programmed to implement a protocol on the particle sorter to sort particles of the sample in the flow stream based on the classification of the components in the image Kits Aspects of the present disclosure further include kits, where kits include one or more of the integrated circuit devices described herein. In some embodiments, kits may further include programming for the subject systems, such as in the form of a computer readable medium (e.g., flash drive, USB storage, compact disk, DVD, Blu-ray disk, etc.) or instructions for downloading the programming from an internet web protocol or cloud server. Kits may further include instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Utility

The subject methods, systems and integrated circuit devices find use in a variety of applications where it is desirable to analyze and identify particle components in a sample in a fluid medium, such as a biological sample. In some embodiments, the integrated circuit devices, methods and systems described herein find use in flow cytometry characterization of biological samples (e.g., labelled with fluorescent tags). Embodiments of the present disclosure find use in applications where a biological sample may be characterized for research or clinical laboratory testing. In some embodiments, the subject methods and devices may facilitate diagnosis for one or more conditions, such as cancer.

Notwithstanding the appended claims, the disclosure is also defined by the following clauses:

1. A method comprising:
   detecting light from a sample comprising particles in a flow stream;
   generating a data signal comprising parameters of the particles from the detected light;
   generating an image based on the data signal;
   comparing the image with one or more image classification parameters; and
   classifying one or more components of the image using a dynamic algorithm that updates the image classification parameters based on the classified components in the image.

2. The method according to clause 1, wherein the dynamic algorithm is a machine learning algorithm.

3. The method according to any one of clauses 1-2, wherein the dynamic algorithm is a machine learning algorithm comprising an artificial neural network.

4. The method according to clause 3, wherein the artificial neural network comprises one or more convolutional neural networks (CNNs).

5. The method according to clause 4, wherein the artificial neural network comprises one or more region-convolutional neural networks (R-CNN).

6. The method according to any one of clauses 1-5, wherein generating the image comprises generating a two-dimensional plot of the particle parameters.

7. The method according to clause 6, wherein the two-dimensional plot is a histogram.

8. The method according to clause 7, wherein each axis of the histogram comprises a particle parameter.

9. The method according to any one of clauses 7-8, wherein each bin of the histogram is converted to a pixel in the image.

10. The method according to any one of clauses 7-9, wherein the method comprises generating a color image from the histogram by:
  normalizing observations corresponding to each bin of the histogram to one or more distinct colors; and
  assigning a color to each pixel based on the normalized observations of each bin of the histogram.

11. The method according to any one of clauses 7-9, wherein the method comprises generating a greyscale image from the histogram by:
  normalizing observations corresponding to each bin of the histogram to one or more distinct shades of grey; and
  assigning a shade of grey to each pixel based on the normalized observations of each bin of the histogram.

12. The method according to any one of clauses 7-11, wherein the method comprises generating the image from two concatenated histograms.

13. The method according to any one of clauses 1-12, wherein classifying one or more components of the image comprises determining the presence of one or more particle types in the image.

14. The method according to clause 13, further comprising generating a clinical diagnosis based on the presence of one or more particle types in the image.

15. The method according to clause 14, wherein the dynamic algorithm is updated based on the generated clinical diagnosis.

16. The method according to any one of clauses 1-15, wherein the generated data signal comprises one or more particle population clusters.

17. The method according to clause 16, wherein generating the data signal comprises assigning particles to a particle population cluster.

18. The method according to clause 17, wherein generating the image comprises gating one or more of the particle population clusters.

19. The method according to clause 18, wherein gating one or more of the particle population clusters comprises comparing parameters of the particle population cluster with a predetermined threshold.

20. The method according to clause 19, wherein the method comprises generating an image based on the gated particle population clusters that exceed the predetermined threshold.

21. A system comprising:
  a light source configured to irradiate a sample comprising particles in a flow stream;
  a light detection system comprising a photodetector; and
  a processor comprising memory operably coupled to the processor wherein the memory comprises instructions stored thereon, which when executed by the processor, cause the processor to:
  generate a data signal comprising parameters of the particles from light detected from the flow stream;
  generate an image based on the data signal;
  compare the image with one or more image classification parameters; and
  classify one or more components of the image using a dynamic algorithm that updates the image classification parameters based on the classified components in the image.

22. The system according to clause 21, wherein the dynamic algorithm is a machine learning algorithm.

23. The system according to any one of clauses 21-22, wherein the dynamic algorithm is a machine learning algorithm comprising an artificial neural network.

24. The system according to clause 23, wherein the artificial neural network comprises one or more convolutional neural networks (CNNs).

25. The system according to clause 24, wherein the artificial neural network comprises one or more region-convolutional neural networks (R-CNN).

26. The system according to any one of clauses 21-25, wherein the memory comprises instructions stored thereon, which when executed by the processor, further cause the processor to generate a two-dimensional plot of the particle parameters.

27. The system according to clause 26, wherein the two-dimensional plot is a histogram.

28. The system according to clause 27, wherein each axis of the histogram comprises a particle parameter.

29. The system according to any one of clauses 27-28, wherein the memory comprises instructions stored thereon, which when executed by the processor, further cause the processor to convert each bin of the histogram to a pixel in the image.

30. The system according to any one of clauses 27-29, wherein the memory comprises instructions stored thereon, which when executed by the processor, further cause the processor to generate a color image from the histogram by:
  normalizing observations corresponding to each bin of the histogram to one or more distinct colors; and
  assigning a color to each pixel based on the normalized observations of each bin of the histogram.

31. The system according to any one of clauses 27-29, wherein the memory comprises instructions stored thereon, which when executed by the processor, further cause the processor to generate a greyscale image from the histogram by:
  normalizing observations corresponding to each bin of the histogram to one or more distinct shades of grey; and
  assigning a shade of grey to each pixel based on the normalized observations of each bin of the histogram.

32. The system according to any one of clauses 27-31, wherein the memory comprises instructions stored thereon, which when executed by the processor, further cause the processor to generate the image from two concatenated histograms.

33. The system according to any one of clauses 21-32, wherein the memory comprises instructions stored thereon, which when executed by the processor, further cause the processor to classify one or more components of the image comprises by determining the presence of one or more particle types in the image.

34. The system according to clause 33, wherein the memory comprises instructions stored thereon, which when executed by the processor, further cause the processor to generate a clinical diagnosis based on the presence of one or more particle types in the image.

35. The system according to clause 34, wherein the memory comprises instructions stored thereon, which when executed by the processor, further cause the processor to update the dynamic algorithm based on the generated clinical diagnosis.

36. The system according to any one of clauses 21-35, wherein the generated data signal comprises one or more particle population clusters.

37. The system according to clause 36, wherein the memory comprises instructions stored thereon, which when executed by the processor, further cause the processor to assign particles to a particle population cluster.

38. The system according to clause 37, wherein the memory comprises instructions stored thereon, which when executed by the processor, further cause the processor to generate the image by gating one or more of the particle population clusters.

39. The system according to clause 38, wherein the memory comprises instructions stored thereon, which when executed by the processor, further cause the processor to gate one or more of the particle population clusters by comparing parameters of the particle population cluster with a predetermined threshold.

40. The system according to clause 39, wherein the memory comprises instructions stored thereon, which when executed by the processor, further cause the processor to generate an image based on the gated particle population clusters that exceed the predetermined threshold.

41. The system according to any one of clauses 21-40, wherein the light detection system is configured to detect light absorption, light scatter, fluorescence or a combination thereof.

42. The system according to any one of clauses 21-41, wherein the processor comprises memory operably coupled to the processor wherein the memory comprises instructions stored thereon, which when executed by the processor, cause the processor to generate a data signal comprising parameters of the particles from fluorescent light detected from the flow stream.

43. The system according to clause 42, wherein the data signal is generated from frequency-encoded fluorescence data from the particles.

44. The system according to any one of clauses 21-43, wherein the light source comprises a light beam generator component configured to generate at least a first beam of frequency shifted light and a second beam of frequency shifted light.

45. The system according to clause 44, wherein the light beam generator comprises an acousto-optic deflector.

46. The system according to any one clauses 44-45, wherein the light beam generator comprises a direct digital synthesizer (DDS) RF comb generator.

47. The system according to any one of clauses 44-46, wherein the light beam generator component is configured to generate a frequency-shifted local oscillator beam.

48. The system according to any one of clauses 44-47, wherein the light beam generator component is configured to generate a plurality of frequency-shifted comb beams.

49. The system according to any one of clauses 21-48, wherein the light source comprises a laser.

50. The system according to clause 49, wherein the laser is a continuous wave laser.

51. The system according to any one of clauses 21-50, wherein the system is a flow cytometer.

52. The system according to any one of clauses 21-51, further comprising a cell sorter.

53. The system according to clause 52, wherein the cell sorter comprises a droplet deflector.

54. An integrated circuit programmed to:
generate an image based on a data signal comprising parameters of a particles from light detected from the flow stream;
compare the image with one or more image classification parameters; and
classify one or more components of the image using a dynamic algorithm that updates the image classification parameters based on the classified components in the image.

55. The integrated circuit according to clause 54, wherein the dynamic algorithm is a machine learning algorithm.

56. The integrated circuit according to any one of clauses 54-55, wherein the dynamic algorithm is a machine learning algorithm comprising an artificial neural network.

57. The integrated circuit according to clause 56, wherein the artificial neural network comprises one or more convolutional neural networks (CNNs).

58. The integrated circuit according to clause 56, wherein the artificial neural network comprises one or more region-convolutional neural networks (R-CNN).

59. The integrated circuit according to any one of clauses 54-58, wherein the integrated circuit is programmed to generate a two-dimensional plot of the particle parameters.

60. The integrated circuit according to clause 59, wherein the two-dimensional plot is a histogram.

61. The integrated circuit according to clause 60, wherein each axis of the histogram comprises a particle parameter.

62. The integrated circuit according to any one of clauses 60-61, wherein the integrated circuit is programmed to convert each bin of the histogram to a pixel in the image.

63. The integrated circuit according to any one of clauses 60-62, wherein the integrated circuit is programmed to generate a color image from the histogram by:
normalizing observations corresponding to each bin of the histogram to one or more distinct colors; and
assigning a color to each pixel based on the normalized observations of each bin of the histogram.

64. The integrated circuit according to any one of clauses 60-62, wherein the integrated circuit is programmed to generate a greyscale image from the histogram by:
normalizing observations corresponding to each bin of the histogram to one or more distinct shades of grey; and
assigning a shade of grey to each pixel based on the normalized observations of each bin of the histogram.

65. The integrated circuit according to any one of clauses 60-64, wherein the integrated circuit is programmed to generate the image from two concatenated histograms.

66. The integrated circuit according to any one of clauses 60-65, wherein the integrated circuit is programmed to further classify one or more components of the image comprises by determining the presence of one or more particle types in the image.

67. The integrated circuit according to clause 66, wherein the integrated circuit is programmed to generate a clinical diagnosis based on the presence of one or more particle types in the image.

68. The integrated circuit according to clause 67, wherein the integrated circuit is programmed to update the dynamic algorithm based on the generated clinical diagnosis.

69. The integrated circuit according to any one of clauses 54-68, wherein the generated data signal comprises one or more particle population clusters.

70. The integrated circuit according to clause 69, wherein the integrated circuit is programmed to assign particles to a particle population cluster.

71. The integrated circuit according to clause 70, wherein the integrated circuit is programmed to generate the image by gating one or more of the particle population clusters.

72. The integrated circuit according to clause 71, wherein the integrated circuit is programmed to gate one or more of the particle population clusters by comparing parameters of the particle population cluster with a predetermined threshold.

73. The integrated circuit according to clause 72, wherein the integrated circuit is programmed to generate an image based on the gated particle population clusters that exceed the predetermined threshold.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A method comprising:
   detecting light from a sample comprising particles in a flow stream;
   generating a data signal comprising parameters of the particles from the detected light;
   generating a two-dimensional image based on the data signal;
   comparing the image with one or more image classification parameters; and
   classifying one or more components of the image using a dynamic algorithm that updates the image classification parameters and the dynamic algorithm based on the classified components in the image.

2. The method according to claim 1, wherein the dynamic algorithm is a machine learning algorithm.

3. The method according to claim 1, wherein the dynamic algorithm is a machine learning algorithm comprising an artificial neural network.

4. The method according to claim 3, wherein the artificial neural network comprises one or more convolutional neural networks (CNNs).

5. The method according to claim 4, wherein the artificial neural network comprises one or more region-convolutional neural networks (R-CNN).

6. The method according to claim 1, wherein generating the image comprises generating a two-dimensional plot of the particle parameters.

7. The method according to claim 6, wherein the two-dimensional plot is a histogram.

8. The method according to claim 7, wherein each axis of the histogram comprises a particle parameter.

9. The method according to claim 7, wherein each bin of the histogram is converted to a pixel in the image.

10. The method according to claim 7, wherein the method comprises generating the image from two concatenated histograms.

11. The method according to claim 1, wherein classifying one or more components of the image comprises determining the presence of one or more particle types in the image.

12. The method according to claim 11, further comprising generating a clinical diagnosis based on the presence of one or more particle types in the image.

13. The method according to claim 12, wherein the dynamic algorithm is updated based on the generated clinical diagnosis.

14. The method according to claim 1, wherein the generated data signal comprises one or more particle population clusters.

15. The method according to claim 14, wherein generating the data signal comprises assigning particles to a particle population cluster.

16. The method according to claim 15, wherein generating the image comprises gating one or more of the particle population clusters.

17. The method according to claim 16, wherein gating one or more of the particle population clusters comprises comparing parameters of the particle population cluster with a predetermined threshold.

18. The method according to claim 17, wherein the method comprises generating an image based on the gated particle population clusters that exceed the predetermined threshold.

19. A system comprising:
    a light source configured to irradiate a sample comprising particles in a flow stream;
    a light detection system comprising a photodetector; and
    a processor comprising memory operably coupled to the processor wherein the memory comprises instructions stored thereon, which when executed by the processor, cause the processor to:
    generate a data signal comprising parameters of the particles from light detected from the flow stream;
    generate a two-dimensional image based on the data signal;
    compare the image with one or more image classification parameters; and
    classify one or more components of the image using a dynamic algorithm that updates the image classification parameters and the dynamic algorithm based on the classified components in the image.

20. An integrated circuit programmed to:
    generate a two-dimensional image based on a data signal comprising parameters of a particles from light detected from the flow stream;
    compare the image with one or more image classification parameters; and
    classify one or more components of the image using a dynamic algorithm that updates the image classification parameters and the dynamic algorithm based on the classified components in the image.

* * * * *